Jan. 7, 1958   U. E. WATERMAN   2,819,415
MOTOR BEARING COOLING
Filed June 27, 1955

Inventor:
Uzal E. Waterman,
by
His Attorney.

United States Patent Office 2,819,415
Patented Jan. 7, 1958

2,819,415

MOTOR BEARING COOLING

Uzal Edwin Waterman, Peterborough, Ontario, Canada, assignor to Canadian General Electric Company, Limited, Toronto, Ontario, Canada, a Canadian company Application June 27, 1955, Serial No. 518,262

5 Claims. (Cl. 310—57)

My invention relates to dynamoelectric machines and particularly to an improved structure for cooling the bearings thereof.

One of the limiting factors in the design of a dynamoelectric machine is the permissible temperature rise of the bearings. In totally enclosed machines the heat developed in the windings and core is dissipated by conduction through the enclosing shell and a fan is usually mounted on the shaft in a chamber in which a pressure is developed causing air drawn from outside the machine to blow air across the shell. The bearings supporting the rotor are mounted on the shell and hence their temperature is caused to rise by conduction from the shell and shaft. With improved insulating materials now available a much higher temperature rise is permissible in the windings than is permissible in the bearings and the limitation of temperature rise in the bearings has thus militated against the most efficient design of the electrical parts of the machine.

The object of my invention is to provide in a dynamoelectric machine an improved construction whereby the bearings are adequately cooled.

Another object of my invention is to provide a simple and inexpensive arrangement of the parts of a totally enclosed dynamoelectric machine whereby a flow of air is provided from the fan chamber to cool the bearings.

In accordance with the illustrated embodiment, a cup-shaped shroud surrounds a bearing supporting the shaft of the dynamoelectric machine in spaced relationship to the bearing to provide an annular passage for coolant air. Entrance and exit openings are provided to carry air into and out of annular passage. A fan pressurizes the air in a chamber near entrance opening and air is discharged to the atmosphere from the annular passage so that air flow through annular passage cools the bearing by conduction.

Figure 1:
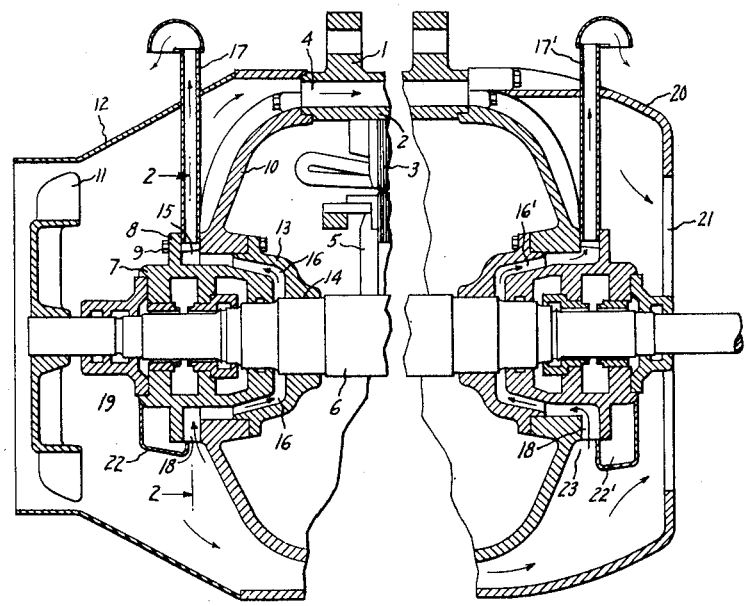
Figure 2:
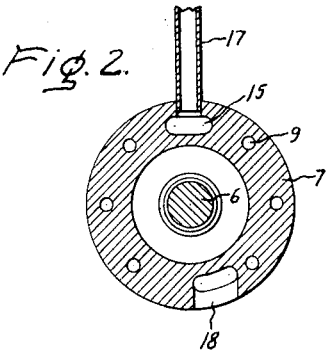

An understanding of my invention will be had from the consideration of the following detailed description of a specific embodiment thereof in which Fig. 1 is a central longitudinal section of a totally enclosed dynamoelectric machine, the central portion of the machine being broken away for convenience in the drawing; and Fig. 2 is a cross sectional view taken on the line A—A of Fig. 1 and looking the direction of the arrows.

Referring to the drawing I have shown a hollow cylindrical main frame 1 which is double-walled. On the interior of the inner wall 2 is mounted a stator 3 and its windings. A plurality of passages 4 are spaced about the circumference of the frame between the inner and outer walls. A rotor indicated at 5 is mounted on a shaft 6 and the shaft is supported in bearings 7, here shown as sleeve bearings although it is apparent that this invention applies equally as well to anti-friction bearings, such as ball bearings. As is usual the bearings are supported by end bells secured to the main frame. The bearings 7 are provided with a peripheral flange 8 which is secured by bolts 9 to the outer edge of end bells 10 which in turn are bolted to the end of the main frame. A fan 11 is mounted on the shaft beyond the bearing and a housing 12 encloses the fan and the bearing constituting a pressure chamber 19 from which air drawn in by the fan is caused to flow through the passages 4. As shown the flange 8 is provided on the bearing at a location such that when in place a substantial proportion of the bearing projects within the end bell. An annular shroud 13 is bolted as indicated to the inner side of the end bell 10 and shaped to follow the contour of the inner end of the bearings 7 but spaced therefrom and extending closely adjacent the shaft. When used with an explosion-proof enclosed machine, the wall of the shroud adjacent the shaft is provided with an extra bed surface 14 which provides a flame-proof seal. The inner side wall 2, end bell 10 and shroud 13 completely enclose the motor and it will be noted an annular passage is located between the outer surface of the shroud and the outer surface of the bearing.

I provide at the top of the bearing in the face of the flange 8 a recess 15 which lies opposite to and in communication with the annular passage 16 extending between the inner end of the bearing and the shroud 13. A pipe 17 leads from the recess 15 and extends through the housing 12 and is open to the atmosphere at its outer end. A recess 18 is provided in the face of the bearing flange 8 at the lower side thereof which provides a passage opening from the fan chamber 19 to the air passage 16.

In operation the fan draws in air through the end of the housing 12 and builds up a superatmospheric pressure in the chamber 19 whereby the air is forced to flow therefrom along the shell to dissipate the heat therein. The cooling air flows through the passages 4 in the main frame as indicated by the arrows. Passages 4 are dimensioned to restrict the unimpeded flow of air therethrough to build up a pressure differential between the chamber 19 and the outside. Thus, air will be forced to circulate from the chamber 19 through the recess 18, annular passage 16, recess 15 and pipe 17 as indicated by the arrows. This flow of cool air passes over a substantial portion of a surface of the bearing 7.

The bearing at the right hand or drive end of the shaft 6 is the same as that described for the fan end and similar reference characters designed by a prime are applied to similar parts. A shroud 20 is bolted to the end of the main frame 1 to direct the air flowing from the passages 4 to an outlet 21. A vent pipe 17' leads from the annular passage 16' to the outside air. Means are provided whereby air under pressure arising from the operation of the fan is supplied to the inlet to the annular passage 16'. This may be done in any convenient manner, for example by providing a pipe leading from a point of pressure, in the fan chamber and terminating in the recess 18'. The pipe if desired may pass through one of the passages 4 between the inner and outer shell. In the drawings there has been illustrated a simplified method of supplying air at superatmospheric pressure to the inlet 18'. This is done by converting the kinetic energy of the air flowing from the passages 4 to the outlet 21. To convert the kinetic energy of the air flowing from the exit end of the passages 4 to the outlet 21 to a pressure head to cause circulation through the pasage 16', a baffle is provided extending into the flow at the downstream side of the recess 18'. In the form shown, the baffle is conveniently constituted by the oil reservoir 22' associated with the bearing which for its present purpose is made somewhat longer than a similar reservoir 22 provided on the bearing at the fan end. The projecting reservoir 22' constitutes a baffle and provides a pocket 23 at the entrance to the recess 18' leading to the air passage 16' in which pocket a pressure is built up causing a circulation of cooling air around the bearing as has been previously described in connection with the bearing at the fan end.

It will be apparent that by a simple, compact, and inexpensive construction of the customary parts I take advantage of the customary fan provided for forcing cooling air to flow around the exterior of the machine to provide also for cooling the bearings.

Furthermore, it is apparent that when this type of construction is applied to explosion-proof enclosed machines, access can be had to the bearings without the necessity of interfering with the explosion-proof enclosure.

While I have illustrated and described in detail a specific construction embodying my invention, it is understood that various changes and modifications may be made without departing from its spirit. My invention is therefore not limited to the particular embodiment described but includes all equivalent parts and modifications coming within the scope of the claims.

What I claim as new and desire to secure by Letters Patent of the United States Patent Office is:

1. A dynamoelectric machine having a stator and a rotor having its shaft mounted in bearings supported by end bells mounted on the stator, a shroud mounted on the inner surface of each end bell and extending to form a seal with the shaft, said shrouds located with respect to their associated bearing so that a closed annular passage is provided between it and a substantial portion of the surface of the bearing, a housing member at one end of the machine enclosing the bearing at that end and constituting a fan chamber, a fan in the chamber and mounted on the shaft and adapted to draw air into the chamber from which the air under pressure flows in conductive relation to the machine, an opening communicating with one point of the said annular passage and a conduit leading from another point thereof to the atmosphere whereby cooling air from said fan chamber flows through the bearing at the fan end of the machine, and means whereby the air under pressure in the fan chamber causes a flow of cooling air through the annular passage at the other end of the machine.

2. A dynamoelectric machine having a stator and a rotor having its shaft mounted in bearings supported by end bells mounted on the stator, a housing member at one end of the machine enclosing the bearing at that end and constituting a fan chamber, a fan in the chamber and mounted on the shaft and adapted to draw air into the chamber and cause it to flow in heat conductive relation to the machine, the bearings having a projecting annular flange midway of their length and bolted through this flange to the outer side of the end bells, a shroud mounted on the inner surface of each end bell and extending adjacent to and following the general contour of the surface of the part of the bearing it encloses and terminating in a seal with the shaft whereby an annular passage is provided between the shroud and the bearing surface, the bearing flanges having a recess in the face thereof at the upper side and opening into the said annular passages, a pipe leading from the said recess to the atmosphere, and an opening leading to the annular passages at the lower side of the bearing, whereby cooling air from said fan chamber flows through the bearing at the fan end of the machine, and means whereby the air under pressure in the fan chamber causes a flow of cooling air through the annular passage at the other end of the machine.

3. A dynamoelectric machine comprising a stator member and a rotor member having a shaft, an end bell on said stator member, a bearing for the shaft supported by said end bell, a shroud spaced from said bearing to define an annular chamber therewith, said shroud providing a seal with said shaft, means for circulating a coolant through passages of said machine, means providing communication between said annular chamber and said coolant passages, and a conduit providing communication between said annular chamber and a point of lower pressure separate from said coolant passages.

4. A dynamoelectric machine comprising a stator member and a rotor member having a shaft, an end bell at each end of said stator member including a bearing for supporting said shaft, each of said end bells providing a cup-shaped shroud spaced from said bearing to provide an annular chamber therewith, said shroud providing a seal with said shaft, means defining a coolant passage for cooling said machine, means for circulating a coolant through said passage means, communication means between each of said annular chambers and said passage means, means for restricting the flow of the coolant in said passage means at a point downstream from one of said communication means to cause coolant to flow through one of said annular chambers, and an air scoop adjacent the other of said communication means to cause coolant to flow into the other of said annular chambers to cool said bearings.

5. A dynamoelectric machine as recited in claim 4 wherein said air scoop comprises an oil reservoir projecting into the coolant passage means.

References Cited in the file of this patent

UNITED STATES PATENTS

| | | |
|---|---|---|
| 2,223,847 | Engdahl | Dec. 3, 1940 |
| 2,228,104 | Baudry | Jan. 7, 1941 |
| 2,294,586 | Troller | Sept. 1, 1942 |